US012477283B2

(12) United States Patent
Yoshida et al.

(10) Patent No.: US 12,477,283 B2
(45) Date of Patent: Nov. 18, 2025

(54) SPEAKER UNIT

(71) Applicant: Yamaha Corporation, Hamamatsu (JP)

(72) Inventors: Azumi Yoshida, Hamamatsu (JP); Tsukasa Suenaga, Iwata (JP); Tsunenori Sano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 196 days.

(21) Appl. No.: 18/521,085

(22) Filed: Nov. 28, 2023

(65) Prior Publication Data

US 2024/0098425 A1 Mar. 21, 2024

Related U.S. Application Data

(63) Continuation of application No. PCT/JP2022/020200, filed on May 13, 2022.

(30) Foreign Application Priority Data

May 31, 2021 (JP) ................................ 2021-091039

(51) Int. Cl.
*H04R 9/06* (2006.01)

(52) U.S. Cl.
CPC .................................... *H04R 9/06* (2013.01)

(58) Field of Classification Search
CPC ........ H04R 9/025; H04R 1/023; H04R 1/025; H04R 9/046; H04R 7/127; H04R 9/06; H04R 7/18; H04R 9/045; H04R 2209/026; H04R 31/00; H04R 2209/024; H04R 2209/021; H04R 9/043; H04R 7/20; H04R 2201/34; H04R 2400/13; H04R 9/066;

(Continued)

(56) References Cited

U.S. PATENT DOCUMENTS 7,039,211 B2 * 5/2006 Werner .................... H04R 1/30 381/339
8,831,270 B1 * 9/2014 Dimitrov ................ H04R 1/30 381/401

(Continued)

FOREIGN PATENT DOCUMENTS

JP 5560893 B2 7/2014

OTHER PUBLICATIONS

International Preliminary Report on Patentability (PCT/IB/338 & PCT/IB/373) issued in PCT Application No. PCT/JP2022/020200 dated Dec. 14, 2023, including Japanese-language Written Opinion (PCT/ISA/237) with English translation (8 pages).

(Continued)

*Primary Examiner* — Carolyn R Edwards
*Assistant Examiner* — Julie X Dang
(74) *Attorney, Agent, or Firm* — Crowell & Moring LLP

(57) ABSTRACT

A speaker unit includes a yoke, a magnet, a voice coil and a partitioner. The yoke includes a base portion and a protruding portion protruding from the base portion. The magnet is disposed on the base portion. The top plate is disposed on the magnet. A magnetic gap is formed between the top plate and the protruding portion. The voice coil is disposed in the magnetic gap. The partitioner is disposed in a surrounded-space surrounded by the yoke, the magnet and the top plate. The partitioner is spaced apart from the base portion. The partitioner includes at least one opening.

17 Claims, 4 Drawing Sheets

(58) Field of Classification Search
CPC ...... H04R 1/30; H04R 1/288; H04R 2400/11; H01F 7/066; H01F 7/081; H01F 7/0289
USPC .................................. 181/144, 155; 381/386
See application file for complete search history.

(56) References Cited

U.S. PATENT DOCUMENTS

| | | | | |
|---|---|---|---|---|
| 2002/0057819 | A1* | 5/2002 | Czerwinski | H04R 1/30 381/430 |
| 2007/0147647 | A1* | 6/2007 | Voishvillo | H04R 1/30 381/343 |
| 2009/0310808 | A1* | 12/2009 | Button | H04R 1/2853 381/339 |
| 2010/0290658 | A1* | 11/2010 | Dodd | H04R 1/30 381/343 |
| 2011/0168480 | A1* | 7/2011 | Sterling | H04R 1/2803 181/176 |
| 2016/0105744 | A1* | 4/2016 | Voishvillo | H04R 1/30 381/343 |
| 2018/0255399 | A1* | 9/2018 | Voishvillo | H04R 1/28 |
| 2019/0174224 | A1* | 6/2019 | Chen | H04R 1/025 |

OTHER PUBLICATIONS

International Search Report (PCT/ISA/210) issued in PCT Application No. PCT/JP2022/020200 dated Jun. 28, 2022 with English translation (5 pages).

* cited by examiner

SPEAKER UNIT

CROSS-REFERENCE TO RELATED APPLICATIONS

The present application is a continuation application of International Application No. PCT/JP2022/020200, filed on May 13, 2022, which claims priority to Japanese Patent Application No. 2021-091039, filed on May 31, 2021. The entire contents of these applications are incorporated herein in their entirety.

BACKGROUND ART

This disclosure relates to a speaker unit of an electrodynamic speaker.

There has been known a speaker unit of an electromagnetic speaker including a diaphragm having a voice coil, and a magnetic circuit having a magnetic gap in which the voice coil is disposed. In the speaker unit, when the voice coil in the magnetic gap is energized, the diaphragm is driven so as to perform sound emission.

SUMMARY

In a speaker unit, there is a problem in which sound quality of the emitted sound deteriorates because of a standing wave generated in a space inside the speaker unit. Regarding this problem, there has been known a speaker unit in which an air communication passage is provided at a magnetic circuit of a horn speaker so as to perform air communication between an inside space and an outside space of the speaker unit.

Accordingly, an aspect of the disclosure relates to a speaker unit capable of suppressing a standing wave generated in an inside space of a magnetic circuit of the speaker unit.

In one aspect of the disclosure, a speaker unit includes a yoke including a base portion and a protruding portion protruding from the base portion, a magnet disposed on the base portion, a top plate disposed on the magnet, a magnetic gap being formed between the top plate and the protruding portion, a voice coil disposed in the magnetic gap, and a partitioner disposed in a surrounded-space surrounded by the yoke, the magnet and the top plate. The partitioner is spaced apart from the base portion. The partitioner includes at least one opening.

In another aspect of the disclosure, a speaker unit includes a yoke, a magnet disposed on the yoke and a top plate disposed on the magnet. A magnetic gap is formed between the top plate and the yoke. The speaker unit further includes a voice coil disposed in the magnetic gap and a partitioner configured to partition a surrounded-space surrounded by the magnet and the top plate into a first space and a second space. The partitioner includes at least one opening. The voice coil is disposed in the first space, and the voice coil is disposed in a location other than in the second space.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION

Hereinafter, there will be described embodiments of the present disclosure with reference to figures.

Figure 1:
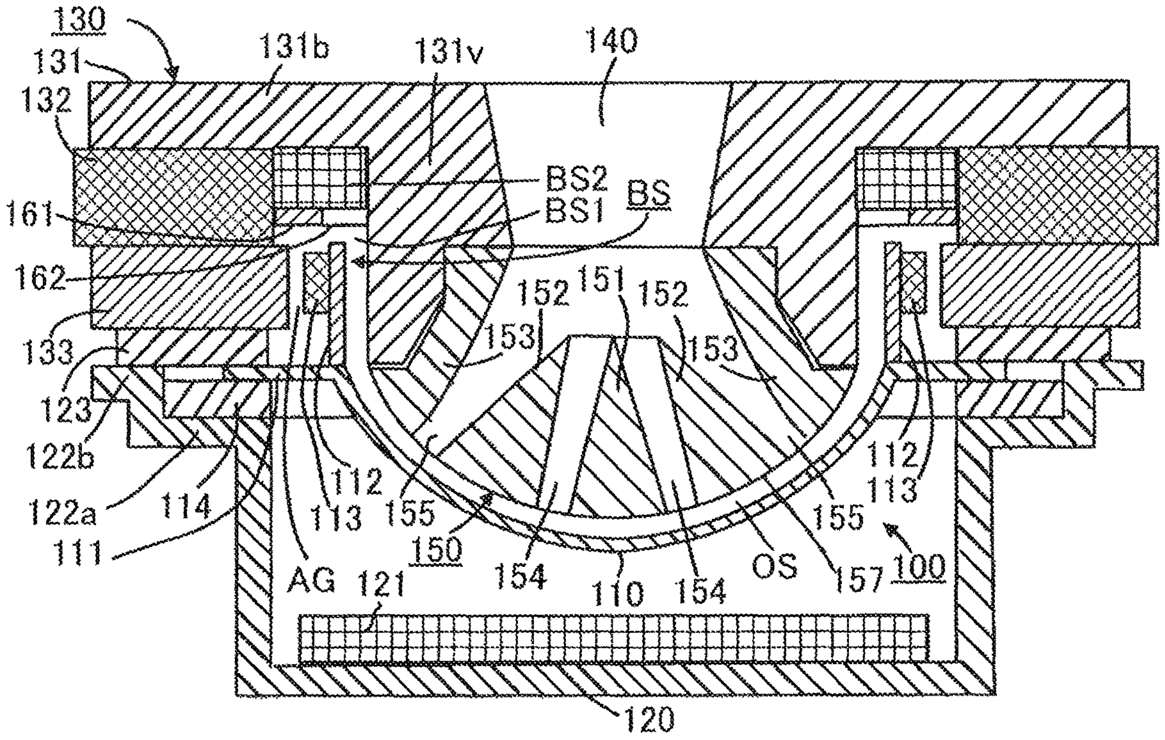
FIG. 1 is a cross-sectional view illustrating a configuration of a compression driver.

FIG. 1 is a cross-sectional view illustrating a configuration of a compression driver 100 which is an embodiment of the disclosure. The compression driver 100 functions as a speaker unit configured to perform sound emission by supplying air pressure wave to a throat 140 of a horn speaker by a diaphragm 110 and a phase plug 150. A sound-emitting direction of the horn speaker is an upward direction in FIG. 1.

The diaphragm 110 has a dome shape. A circumference of a portion of the diaphragm 110 having the dome shape is surrounded by a peripheral portion 111 (what is called an edge) having a circular ring shape. A voice-coil bobbin 112 having a hollow cylindrical shape is disposed on an upper surface of the peripheral portion 111 which faces the sound-emitting direction, that is, a surface facing upward in FIG. 1, and a voice coil 113 is wound around the voice-coil bobbin 112. Moreover, the peripheral portion 111 is bonded and fixed by being sandwiched between a locator ring 123 and a terminal ring 114. The locator ring 123 is located on the upper surface of the peripheral portion 111 in FIG. 1, and the terminal ring 114 is located on an opposite side, that is, a lower surface of the peripheral portion 111 in FIG. 1.

A rear cover 120 is a member having a hollow cylindrical shape and an opening that opens upward is formed at an upper portion of the rear cover 120 in FIG. 1. A sound absorber 121 is disposed on a bottom surface of the rear cover 120, which is positioned on a lower side of the rear cover 120 in FIG. 1. An area of the rear cover 120 around the opening has a stepped shape which is consisted of an inside peripheral portion 122*a* as a lower step and an outside peripheral portion 122*b* as an upper step. An outer circumferential area of the terminal ring 114 is disposed on the inside peripheral portion 122*a*, and an outer circumferential area of the locator ring 123 is disposed on the outside peripheral portion 122*b*. The rear cover 120 accommodates a portion of the diaphragm 110 protruding from the terminal ring 114 and located in the opening of the rear cover 120. The rear cover 120, the terminal ring 114 and the diaphragm 110 define an air-tightly enclosed space.

A magnetic circuit 130 is consisted of a yoke 131, a magnet 132 and a top plate 133. A recess having a truncated cone shape is formed at a center area of a base surface of the yoke 131 which is an upper surface of the yoke in FIG. 1, and the yoke 131 in which the recess is formed functions as the throat 140 of the horn of the horn speaker. The yoke 131 is consisted of a base portion 131*b* having a circular ring shape and surrounding the throat 140 and a protruding portion 131*v* having a substantially hollow cylindrical shape and protruding in a direction approaching to the diaphragm 110 so as to surround the throat 140 at a position near to a center of the base portion 131*b*. The magnet 132 is a magnet having a circular ring shape and is disposed on one surface of the base portion 131*b* at an outside area of the protruding portion 131*v*. The top plate 133 is made of magnetic material and has a circular ring shape, and the top plate 133 is sandwiched between the magnet 132 and the locator ring 123. In the magnet 132, a first pole of the N pole and the S pole is in contact with the base portion 131*b*, and a second pole of the N pole and the S pole is in contact with the top plate 133.

The phase plug 150 includes a cone-shaped member 151, a circular-shaped member 152 surrounding an outer circumference of the cone-shaped member 151 and a circular-shaped member 153 surrounding an outer circumference of the circular-shaped member 152. Parts of the cone-shaped member 151, the circular-shaped member 152 and the circular-shaped member 153 are respectively connected to one another so that slits 154 are interposed between the cone-shaped member 151 and the circular-shaped member 152, and slits 155 are interposed between the circular-shaped member 152 and the circular-shaped member 153. A sound collecting surface 157 of the phase plug 150 facing the diaphragm 110 curves along the diaphragm 110.

In the protruding portion 131*v* of the yoke 131, a recessed portion is formed on an end surface in an opposite direction of the sound-emitting direction, that is, a downward direction in FIG. 1, and a portion of the phase plug 150 located on an opposite side of the sound collecting surface 157 is inserted and stored. And, a magnetic gap AG is formed between an outer side surface of the protruding portion 131*v* of the yoke 131 and an inner side surface of the top plate 133. Magnetic flux circulating the magnetic circuit 130 passes through the magnetic gap AG. The voice coil 113 wound around the voice-coil bobbin 112 positioned at an outer circumferential area of the diaphragm 110 is disposed in the magnetic gap AG.

Alternating current based on an audio signal flows to the voice coil 113. When alternating current flows to the voice coil 113 positioned in the magnetic gap AG, the voice-coil bobbin 112 is driven in a direction in which a central axis of the phase plug 150 extends, and the diaphragm 110 to which the voice-coil bobbin 112 is fixed vibrates. When the diaphragm 110 vibrates, a space OS located between the diaphragm 110 and the phase plug 150 is pushed out and pulled back through each of the slits 154, 155 of the phase plug 150. Then, compression waves of air generated by being pushed out and pulled back are supplied to the throat 140 of the horn as sound waves, the sound waves are emitted to an outside space from the horn.

Here, as illustrated in FIG. 1, a space BS (as an example of a surrounded-space) surrounded by the yoke 131, the magnet 132 and the top plate 133 is formed in the magnetic circuit 130. Then, when emitting sound, a standing wave is generated in the space BS by vibrations of the diaphragm 110, the voice-coil bobbin 112 and the voice coil 113. In a case where no action is taken, the quality of emitted sound deteriorates because of the standing wave.

Then, in the present embodiment, a partitioner 161 having a circular ring shape is disposed in the space BS surrounded by the yoke 131, the magnet 132 and the top plate 133, and openings 162 that each opens toward the magnetic gap AG are formed at portions of the partitioner 161. The partitioner 161 is spaced apart from the base portion 131*b*, and the partitioner 161 partitions the space BS into a space BS1 (as an example of a first space) having a circular ring shape and located on a magnetic-gap-AG side and a space BS2 (as an example of a second space) having a circular ring shape and interposed between the partitioner 161 and the base portion 131*b*. That is, the partitioner 161 having a circular ring shape is located at a position closer to the base portion 131*b* of the yoke 131 than the voice coil 113, that is, located at a position between the base portion 131*b* and the voice coil 113. In a case where the partitioner 161 is disposed in this manner, the partitioner 161 can be called a member configured to partition the space BS into the space BS1, having a circular ring shape and located on the magnetic-gap-AG side, which is a space in which the voice coil 113 is included and the space BS2, interposed between the partitioner 161 and the base portion 131*b*, which is a space in which the voice coil 113 is not included. And, in the present embodiment, the space BS2 having a circular ring shape and interposed between the partitioner 161 and the base portion 131*b* functions as a pipe-resonator, and the standing wave generated in the space BS is decreased. Moreover, in the present embodiment, in order to increase an amount of attenuation of the standing wave, the space BS2 having a circular ring shape and interposed between the partitioner 161 and the base portion 131*b* is filled with a sound absorber 163. That is, as illustrated in FIG. 1, the sound absorber 163 is disposed so that the sound absorber 163 occupies the entire space of the space BS2 having a circular ring shape and interposed between the partitioner 161 and the base portion 131*b*. It is noted that the partitioner 161 having a circular ring shape has a plate shape, a thickness of which is smaller than that of the magnet 132, and an outer diameter of the partitioner 161 is substantially the same as an inner diameter of the magnet 132 having a circular ring shape. Moreover, an inner diameter of the partitioner 161 having a circular ring shape is substantially the same as an outer diameter of the protruding portion 131*v* of the yoke 131. Accordingly, the partitioner 161 having a circular ring shape is fixed to the magnet 132 and the protruding portion 131*v* in a state in which an outer circumferential portion of the partitioner 161 is in contact with an inner circumferential portion of the magnet 132 and the inner circumferential portion of the partitioner 161 is in contact with an outer circumferential portion of the protruding portion 131*v*. It is noted that the partitioner 161 may be fixed to the magnet 132 or the protruding portion 131*v* by pressing and may be fixed to the magnet 132 or the protruding portion 131*v* by an adhesive agent and so on. The partitioner 161 may be fixed to only one of the magnet 132 and the protruding portion 131*v*. Moreover, as described above, in a case where the partitioner 161 is fixed to at least of one of the magnet 132 and the protruding portion 131*v*, the space surrounded by the partitioner 161, the magnet 132, the base portion 131*b* and the protruding portion 131*v* becomes the space BS2 having a circular ring shape.

Figure 2:
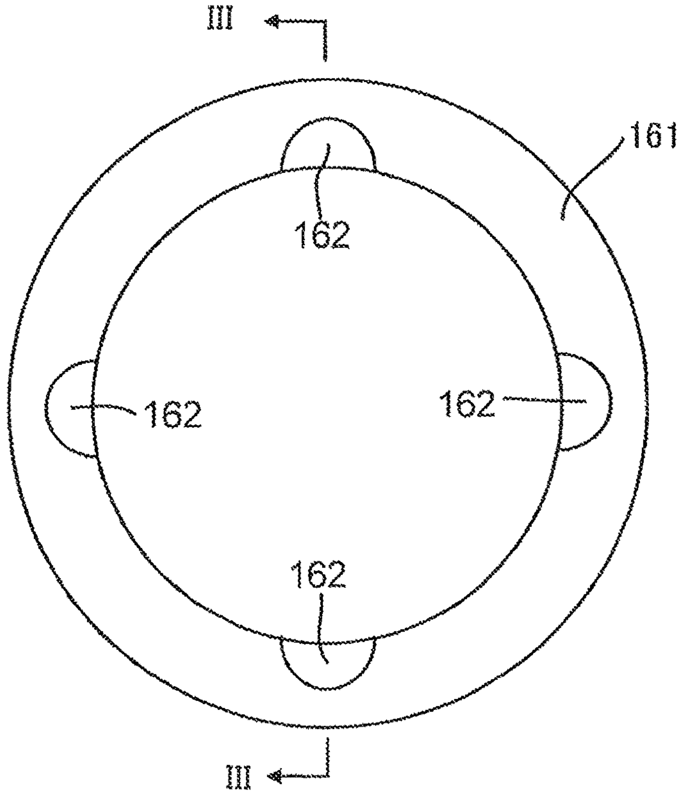
FIG. 2 is a plan view of a resonance device.
Figure 3:
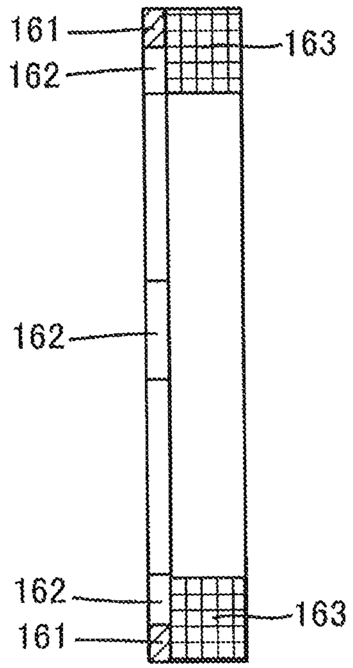
FIG. 3 is a cross-sectional view taken along line in FIG. 2.

FIG. 2 is a plan view of the pipe-resonator in the space BS in FIG. 1 when viewed from a position at which the voice-coil-113 is located. Moreover, FIG. 3 is a cross-sectional view taken along line in FIG. 2. In this example, the partitioner 161 is a plate made of aluminum and having a circular ring shape, and the four openings 162 each having a semicircular shape are formed at regular intervals along an inner circumference of the partitioner 161. In the present embodiment, the space BS2 having a circular ring shape and interposed between the partitioner 161 and the base portion 131*b* functions as the pipe-resonator in which each of the openings 162 becomes an excitation resource.

In the present embodiment, a distance between the two openings 162 adjacent to each other along with a circumferential direction of the partitioner 161 is determined based on a frequency of the standing wave generated in the space BS. That is, the distance between the two adjacent openings 162 is determined so that a frequency of a standing wave in the space BS2 becomes closer to the frequency of the standing wave in the space BS. According to this manner, each of the openings 162 of the partitioner 161 becomes the excitation resource based on the standing wave in the space BS, and the resonance occurs in the space BS2 having a circular ring shape and interposed between the partitioner 161 and the base portion 131*b*. Accordingly, it is possible to generate a standing wave, in the space BS2, having a wavelength λ, in a circumferential direction of a circular ring, and the wavelength λ is the same as that of the standing wave in the space BS. Specifically, a standing wave in which loops of an air particle velocity wave (nodes of a sound pressure wave) are respectively positioned at the openings 162 is generated in the space BS2. In this resonance state, the pressure of the sound and the air particle velocity become high at several positions in the pipe-resonator (the space BS2), and energy consumption caused by air viscosity increases. Accordingly, it is possible to effectively decrease the standing wave generated in the space BS.

Moreover, in the present embodiment, the space BS2 having a circular ring shape and interposed between the partitioner 161 and the base portion 131*b* is filled with the sound absorber 163. As a result of this, energy consumption in the pipe-resonator (the space BS2) increases by the sound absorber 163, thereby, further effectively decreasing the standing wave generated in the space BS.

Figure 4:
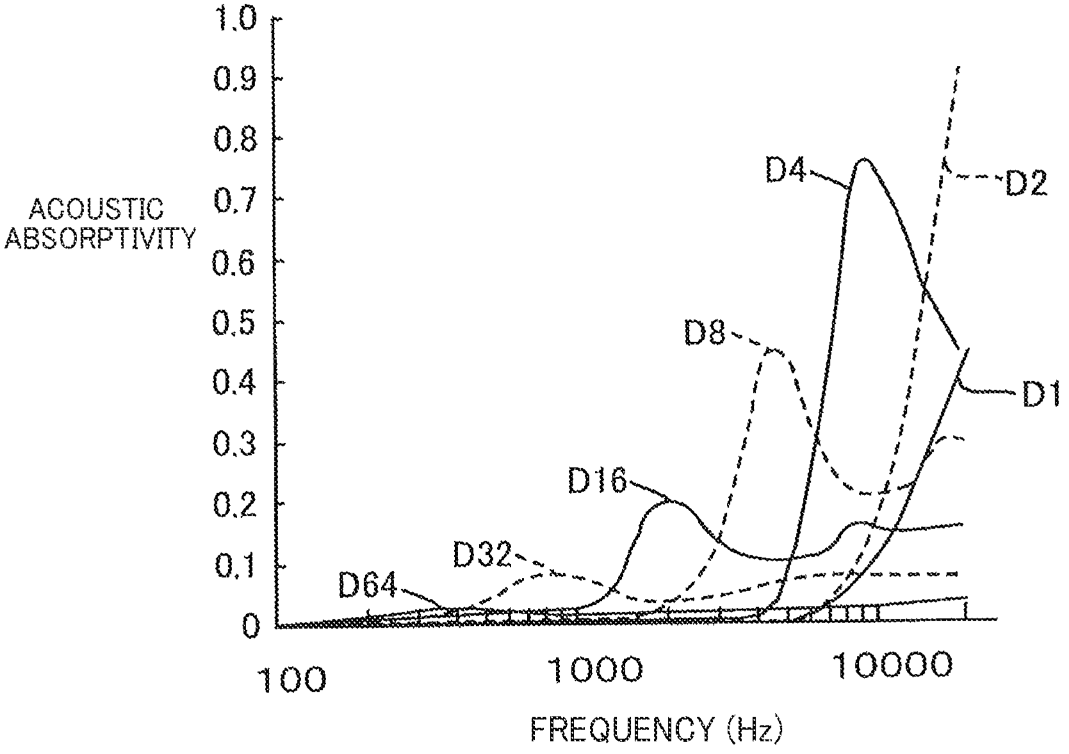
FIG. 4 is a graph representing frequency characteristics of acoustic absorptivity of a common absorber.

FIG. 4 is a graph representing frequency characteristics of acoustic absorptivity of a common sound absorber. In this example, FIG. 4 shows analytical results of a normal incidence sound absorption coefficient of the sound absorber when the pipe-resonator is filled with the sound absorber so that a volume of the sound absorber is kept constant by varying a thickness and an area of the sound absorber. In FIG. 4, a horizontal axis is a frequency of a sound comes at right angles to the sound absorber, and a vertical axis is the normal incidence sound absorption coefficient. The normal incidence sound absorption coefficient is a value calculated by dividing the remainder when subtracting energy of a reflected sound from energy of an incidence sound toward the sound absorber by the energy of the incidence sound. FIG. 4 shows a normal incidence sound absorption coefficient D1 of the sound absorber having a thickness of 1 mm, a normal incidence sound absorption coefficient D2 of the sound absorber having a thickness of 2 mm, a normal incidence sound absorption coefficient D4 of the sound absorber having a thickness of 4 mm, a normal incidence sound absorption coefficient D8 of the sound absorber having a thickness of 8 mm, a normal incidence sound absorption coefficient D16 of the sound absorber having a thickness of 16 mm, a normal incidence sound absorption coefficient D32 of the sound absorber having a thickness of 32 mm and a normal incidence sound absorption coefficient D64 of the sound absorber having a thickness of 64 mm.

As illustrated in FIG. 4, there is a peak in the frequency characteristics of the normal incidence sound absorption coefficient of the sound absorber. This peak is caused by the standing wave in a thickness direction of the sound absorber. Similarly, even in the space BS2, having a circular ring shape, in which the sound absorber 163 is filled, a peak in the sound absorption coefficient is also caused by the standing wave in a cavity longitudinal direction of the space BS2. That is, when the standing wave is generated in the pipe-resonator, the sound pressure of the sound and the air particle velocity become high at several positions in the pipe-resonator. In a case where the sound absorber 163 is disposed in the pipe-resonator, energy consumption increases in the sound absorber 163. As illustrated in FIG. 4, it is possible to adjust the frequency of the peak of the normal incidence sound absorption coefficient by varying the thickness of the sound absorber 163, that is, the length of the cavity of the pipe-resonator. Supposing that the frequency of the standing wave generated in the space BS is about 1 kHz-5 kHz, a suitable length of the cavity is included in a range of about 8 mm-32 mm.

Figure 5:
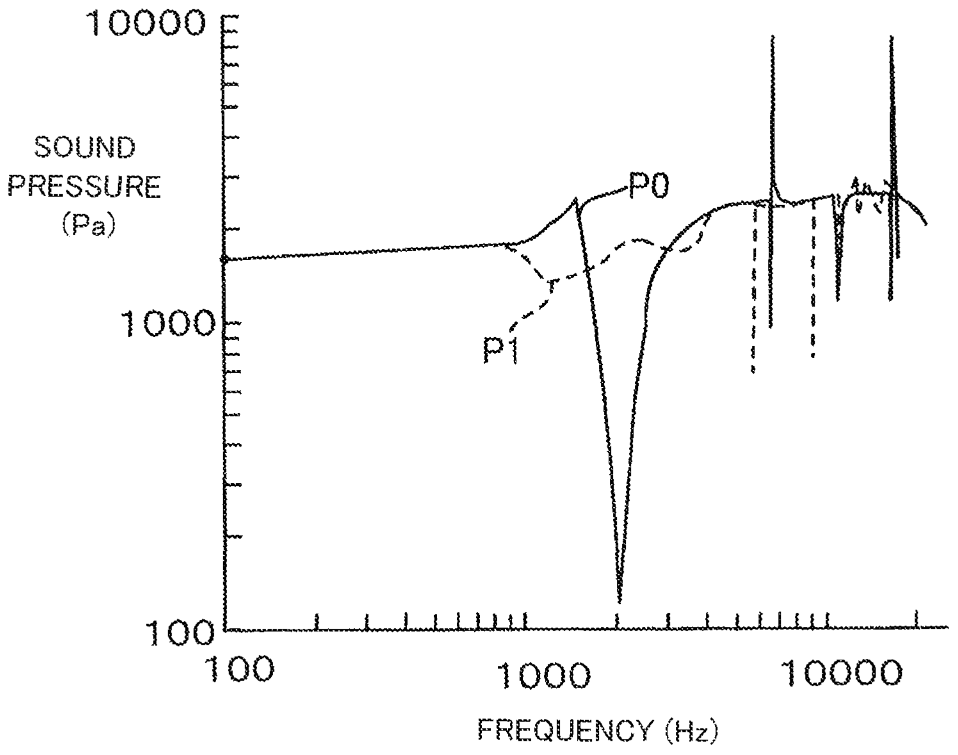
FIG. 5 is a graph representing an effect of the disclosure.

FIG. 5 is a graph representing an effect of the present embodiment. In FIG. 5, a horizontal axis is a frequency of a sound emitted from a horn speaker, and a vertical axis is a sound pressure at an outlet of a throat obtained by numerical analysis based on the assumption that that a diaphragm vibrates at a constant speed in a horn speaker. FIG. 5 shows frequency characteristics P0 of a sound pressure in a case where the partitioner 161 and the sound absorber 163 are not disposed in the space BS in the present embodiment and frequency characteristics P1 of a sound pressure in a case where the partitioner 161 and the sound absorber 163 are disposed in the space BS. As illustrated in FIG. 5, there is a large dip at a frequency of about 2 kHz in the frequency characteristics P0 because of the effect of the standing wave generated in the space BS. However, in the frequency characteristics P1, since the pipe-resonance occurs in the space BS2 having a circular ring shape and interposed between the partitioner 161 and the base portion 131*b* and the sound absorber 163 consumes energy of the resonant sound, the standing wave is suppressed and the dip at the frequency of around 2 kHz disappears. Thus, according to the present embodiment, it is possible to suppress the standing wave generated in the space BS.

Figure 6:
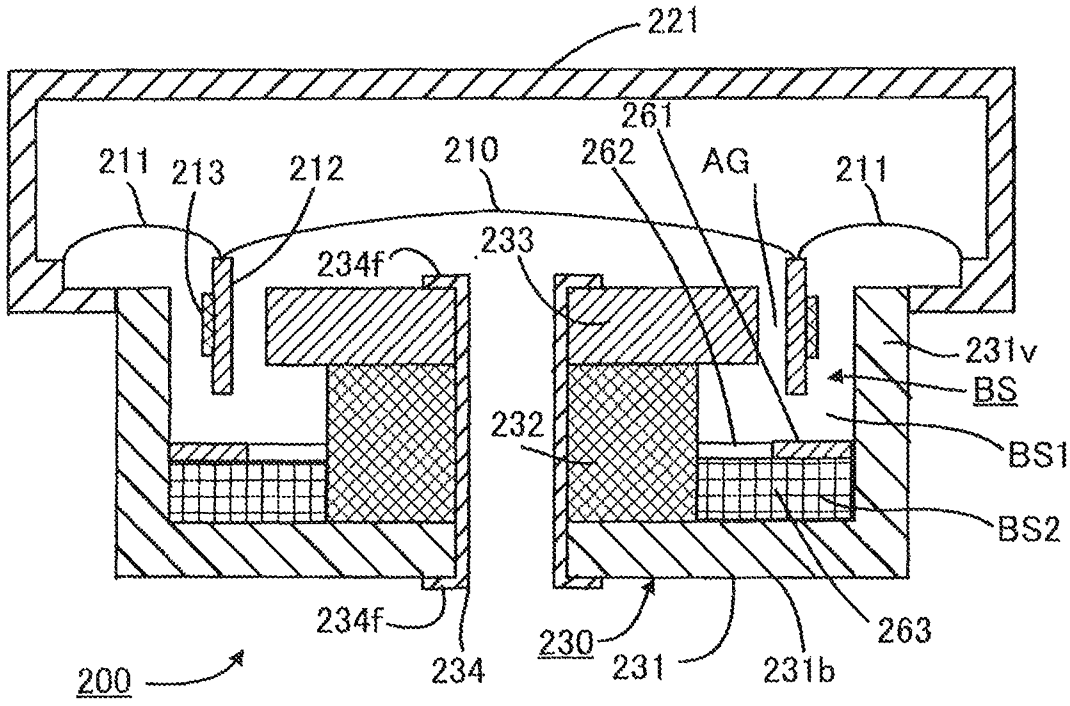
FIG. 6 is a cross-sectional view illustrating a configuration of a headphone driver.

FIG. 6 is a cross-sectional view illustrating a headphone driver 200 of the present disclosure. The headphone driver 200 includes a diaphragm 210, a peripheral portion 211, a voice-coil bobbin 212 around which a voice coil 213 is wound, a magnetic circuit 230 and a protector 221.

The diaphragm 210 has a dome shape. A circumference of a portion of the diaphragm 210 having the dome shape is surrounded by the peripheral portion 211 (what is called an edge) having a circular ring shape. Moreover, the voice-coil bobbin 212 having a hollow cylindrical shape is fixed at the periphery of the diaphragm 210. And, the peripheral edge of the diaphragm 210 and the voice-coil bobbin 212 are fixed to an inner wall of the protector 221 having a substantially lid shape through the peripheral portion 211.

The magnetic circuit 230 includes a yoke 231, a magnet 232, a top plate 233 and an engaging member 234. The yoke 231 is consisted of a base portion 231*b* having a circular ring shape and a protruding portion 231*v* having a hollow cylindrical shape and protruding from the base portion 231*b* at the periphery area of the base portion 231*b*, and the yoke 231 is made of magnetic material. The magnet 232 has a circular ring shape, and the magnet 232 is disposed in an inside space of the protruding portion 231*v* on the base portion 231*b*. The top plate 233 is made of magnetic material and has a circular ring shape, and the top plate 233 is disposed on the magnet 232. Here, the top plate 233 is in contact with a first pole of the N pole and the S pole of the magnet 232, and the base portion 231*b* is in contact with a second pole of the N pole and the S pole of the magnet 232. The engaging member 234 has a hollow cylindrical shape and flanges 234*f* are respectively formed at both ends of the engaging member 234 in an axis direction thereof. The engaging member 234 is disposed so that the engaging member 234 penetrates through a central hole of each of the yoke 231, the magnet 232 and the top plate 233, and the yoke 231, the magnet 232 and the top plate 233 are held between the flanges 234*f* and fixed to one another.

The magnetic gap AG is a space interposed between an outer side surface of the top plate 233 and an inner side surface of the protruding portion 231*v*. The voice coil 213 wound around the voice-coil bobbin 212 is disposed in the magnetic gap AG.

Alternating current based on an audio signal flows to the voice coil 213. As a result of this, the diaphragm 210 to which the voice-coil bobbin 212 is fixed vibrates, and compression waves of air generated by the diaphragm 210 are emitted through a hollow area of the engaging member 234 to ears of a user.

Also in the present embodiment, the space BS surrounded by the yoke 231, the magnet 232 and the top plate 233 is formed in the magnetic circuit 230. Then, when emitting sound, a standing wave is generated in the space BS by vibrations of the diaphragm 210, the voice-coil bobbin 212 and the voice coil 213. In a case where no action is taken, the quality of emitted sound deteriorates because of the standing wave.

Then, in the present embodiment, as in the above described first embodiment, a partitioner 261 having a circular ring shape is disposed in the space BS surrounded by the yoke 231, the magnet 232 and the top plate 233, and openings 262 that each opens toward the magnetic gap AG are formed at portions of the partitioner 261. The partitioner 261 is spaced apart from the base portion 231*b*. Moreover, also in the present embodiment, the space BS2 having a circular ring shape and interposed between the partitioner 261 and the base portion 231*b* is filled with a sound absorber 263. Accordingly, as in the above described first embodiment, it is possible to suppress the standing wave generated in the space BS.

Figure 7:
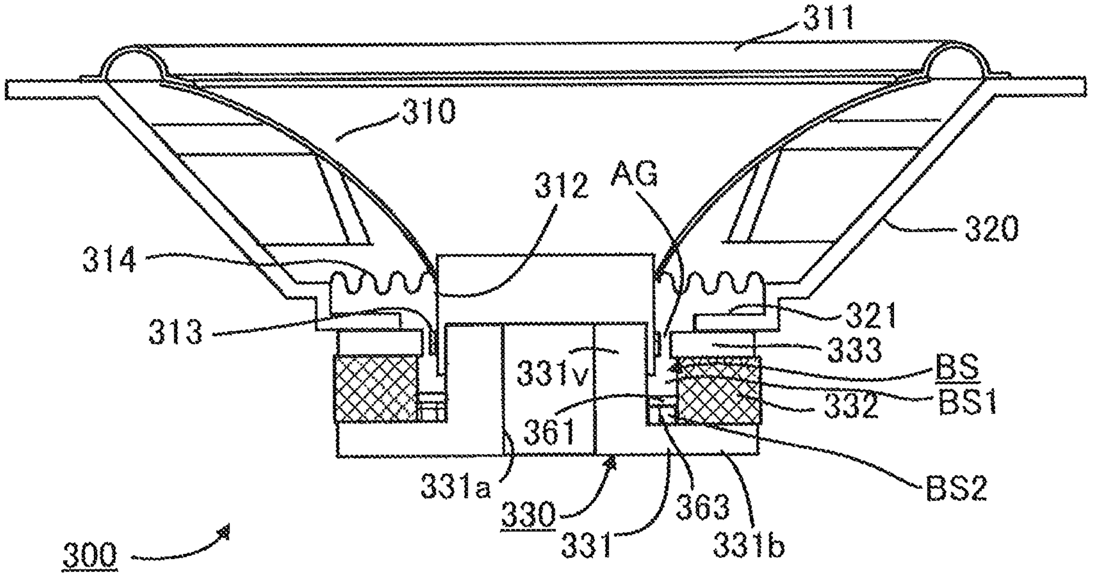
FIG. 7 is a cross-sectional view illustrating a configuration of a woofer unit.

FIG. 7 is a cross-sectional view illustrating a configuration of a woofer unit 300 of the present disclosure. The woofer unit 300 includes a diaphragm 310, a peripheral portion 311 supporting the diaphragm 310, a spider 314, a voice-coil bobbin 312 around which a voice coil 313 is wound, a magnetic circuit 330 and a frame 320.

An external form of the frame 320 has a cone shape so that opening area at each position in a deep direction of the frame 320 increases from a lower end of the frame 320 to an upper end of the frame 320 in the deep direction in FIG. 7. A flange 321 protruding toward an inside of the frame 320 is formed at a lower end of an inner wall of the frame 320. The diaphragm 310 includes a small-opening-end at a lower end position thereof in FIG. 7 and a large-opening-end at an upper end position thereof, and the diaphragm has a cone shape so that opening area at each position in a deep direction of the diaphragm 310 continuously increases from the small-opening-end to the large-opening-end in FIG. 7. The large-opening-end of the diaphragm 310 is surrounded by the peripheral portion 311 (what is called an edge) having a substantially circular ring shape, and the diaphragm 310 is supported by an upper opening end of the frame 320 through the peripheral portion 311. The small-opening-end of the diaphragm 310 is supported by an inner wall of the frame 320 through the spider 314 having a circular ring shape and a wave shape in cross section. Moreover, the small-opening-end of the diaphragm 310 is covered with a top portion of the voice-coil bobbin 312 having a hollow cylindrical shape. The voice-coil bobbin 312 is inserted into a space surrounded by the flange 321.

The magnetic circuit 330 includes a yoke 331. a magnet 332 and a top plate 333. The yoke 331 includes a through hole 331*a* at a central position thereof, and the yoke 331 is consisted of a base portion 331*b* having a circular ring shape and surrounding the through hole 331*a* and a protruding portion 331*v* having a hollow cylindrical shape and protruding from the base portion 331*b* at a position near to the through hole 331*a* of the base portion 331*b*. The yoke 331 is made of magnetic material. The magnet 332 has a circular ring shape and is disposed in an outside area of the protruding portion 331*v* on the base portion 331*b*. The top plate 333 is made of magnetic material having a circular ring shape and is disposed on the magnet 332. Here, the top plate 333 is in contact with a first pole of the N pole and the S pole of the magnet 332, and the base portion 331*b* is in contact with a second pole of the N pole and the S pole of the magnet 332. And, the top plate 333 is sandwiched between the flange 321 as a lower end of the frame 320 and the magnet 332.

The magnetic gap AG is a space interposed between an inner wall surface of the top plate 333 and an outer wall surface of the protruding portion 331*v*. The voice coil 313 wound around the voice-coil bobbin 312 is disposed in the magnetic gap AG.

Also in the present embodiment, alternating current based on an audio signal flows to the voice coil 313. As a result of this, the diaphragm 310 to which the voice-coil bobbin 312 is fixed vibrates, and compression waves of air generated by the diaphragm 210 are emitted to ears of a user.

Also in the present embodiment, the space BS surrounded by the yoke 331, the magnet 332 and the top plate 333 is formed in the magnetic circuit 330. Then, when emitting sound, a standing wave is generated in the space BS by vibrations of the diaphragm 310, the voice-coil bobbin 312 and the voice coil 313. In a case where no action is taken, the quality of emitted sound deteriorates because of the standing wave.

Then, in the present embodiment, as in the above described embodiments, a partitioner 361 having a circular ring shape is disposed in the space BS surrounded by the yoke 331, the magnet 332 and the top plate 333, and openings, which are not illustrated, that each opens toward the magnetic gap AG are formed at portions of the partitioner 361. The partitioner 361 is spaced apart from the base portion 331*b*. Moreover, also in the present embodiment, the space BS2 having a circular ring shape and interposed between the partitioner 361 and the base portion 331*b* is filled with a sound absorber 363. Accordingly, as in the above described embodiments, it is possible to suppress the standing wave generated in the space BS.

While the embodiment has been described above, it is to be understood that the disclosure is not limited to the details of the illustrated embodiment, but may be embodied with various changes and modifications, which may occur to those skilled in the art, without departing from the spirit and scope of the disclosure. Other embodiments are as follows.

In the above embodiment, the four openings 162 are formed in the partitioner 161, however, the number of the openings 161 is an example. N as the number of openings may be obtained by dividing equally a circular ring portion of the partitioner 161 into N number of equal arcs in a circumferential direction of the partitioner 161, and N represents an integer equal to or greater than 1. The length of each of the N number of equal arcs corresponds to a wavelength of the subject standing wave to be suppressed. The N number of openings 162 may be respectively disposed at the N number of equally-divided positions on the circular ring shape portion of the partitioner 161.

In the above described embodiments, the openings that each opens toward the magnetic gap are disposed at all of the N number of equally-divided positions at which the circular ring portion of the partitioner is divided into the N number of equal arcs in the circumferential direction of the partitioner, N representing an integer equal to or greater than 1, however, the openings may not be disposed at all of the divided positions. For example, at least one of the openings may be disposed at least one of the divided position.

In the above described embodiments, the space having a circular ring shape interposed between the partitioner in which the openings are formed and the base portion functions as the pipe-resonator, and each of the openings of the partitioner functions as an open end of a resonance tube. However, in this case, there is a possibility that a resonant wavelength of the pipe-resonator is not identical with the wavelength of the standing wave generated in the space BS. In this case, other partitioners configured to partition a cavity of the pipe-resonator may be disposed at a certain position or a mid-position in the space having a circular ring shape and interposed between the partitioner and the base portion. In this case, a standing wave in which loops of an air particle velocity wave (nodes of a sound pressure wave) are respectively positioned at the openings and nodes of the air particle velocity wave (loops of a sound pressure wave) are respectively positioned at the positions of the other partitioners is generated in the pipe-resonator. The positions of the other partitioners may be adjusted so that each of distances (a length of the cavity) between the openings and the other partitioners corresponds to a wavelength of the standing wave to be suppressed.

In the above described embodiments, the pipe-resonator is formed by providing the partitioner in the space BS. However, in place of the partitioner, another partitioner having a large number of through holes may be disposed in the space BS. In said another partitioner, each of the through holes corresponds to a neck of the Helmholtz resonator, and a space formed between said another partitioner and the base portion corresponds to a cavity of the Helmholtz resonator. The standing wave generated in the space BS may be suppressed by the Helmholtz resonator.

What is claimed is:

1. A speaker unit, comprising:

a yoke including a base portion and a protruding portion protruding from the base portion;

a magnet disposed on the base portion;

a top plate disposed on the magnet, a magnetic gap being formed between the top plate and the protruding portion;

a voice coil disposed in the magnetic gap; and a partitioner disposed in a surrounded-space surrounded by the yoke, the magnet and the top plate, wherein:

the partitioner is spaced apart from the base portion, and the partitioner includes at least one opening.

2. The speaker unit according to claim 1, wherein the partitioner is configured to partition the surrounded-space into a first space and a second space, the first space being located on a magnetic-gap-side of the partitioner, and the second space being located on a base-portion-side of the partitioner.

3. The speaker unit according to claim 1, wherein the second space is interposed between the partitioner and the base portion.

4. The speaker unit according to claim 2, wherein a sound absorber is disposed in the second space.

5. The speaker unit according to claim 1, wherein the surrounded-space is a space having a circular ring shape, and wherein the partitioner has a circular ring shape.

6. The speaker unit according to claim 5, wherein the at least one opening of the partitioner opens toward a magnetic-gap side of the partitioner, the at least one opening being located at one of positions at which a circular ring portion of the partitioner is divided into N number of equal arcs in a circumferential direction of the partitioner, N representing an integer equal to or greater than 1.

7. The speaker unit according to claim 1, wherein the partitioner is fixed to at least one of the magnet and the protruding portion of the yoke.

8. The speaker unit according to claim 1, wherein the partitioner is disposed between the base portion of the yoke and the voice coil.

9. The speaker unit according to claim 4, wherein the second space is filled with the sound absorber.

10. A speaker unit, comprising:

a yoke;

a magnet disposed on the yoke;

a top plate disposed on the magnet, a magnetic gap being formed between the top plate and the yoke;

a voice coil disposed in the magnetic gap; and a partitioner configured to partition a surrounded-space surrounded by the magnet and the top plate into a first space and a second space, the partitioner including at least one opening, the voice coil being disposed in the first space, the voice coil being disposed in a location other than in the second space.

11. The speaker unit according to claim 10, further comprising: a sound absorber that is disposed in the second space that is interposed between a base portion of the yoke and the partitioner.

12. The speaker unit according to claim 10, wherein the surrounded-space is a space having a circular ring shape, and wherein the partitoner has a circular ring shape.

13. The speaker unit according to claim 12, wherein the at least one opening of the partitioner opens toward a magnetic-gap side of the partitioner, the at least one opening being located at one of a plurality of positions at which a circular ring portion of the partitioner is divided into N number of equal arcs in a circumferential direction of the partitioner, N representing an integer equal to or greater than 1.

14. The speaker unit according to claim 11, wherein the partitioner is configured to partition the surrounded-space into the first space that is located on a magnetic-gap-side of the partitioner and the second space that is interposed between the partitioner and the base portion of the yoke.

15. The speaker unit according to claim 11, wherein the partitioner is fixed to at least one of the magnet and a protruding portion of the yoke protruding from the base portion of the yoke.

16. The speaker unit according to claim 11, wherein the partitioner is disposed between the base portion of the yoke and the voice coil.

17. The speaker unit according to claim 11, wherein the second space is filled with the sound absorber.

* * * * *